United States Patent
Gopinathan et al.

(10) Patent No.: US 10,666,766 B2
(45) Date of Patent: May 26, 2020

(54) APPLICATION DESCRIPTIVE LANGUAGE FOR NETWORK GATEWAYS

(71) Applicant: Cisco Technology, Inc., San Jose, CA (US)

(72) Inventors: Sujay Gopinathan, Fremont, CA (US); Jeslin Antony Puthenparambil, San Jose, CA (US); Vivek Datar, Cupertino, CA (US); Binod Roay, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 15/479,484

(22) Filed: Apr. 5, 2017

(65) Prior Publication Data

US 2018/0295210 A1 Oct. 11, 2018

(51) Int. Cl.

| | | |
|---|---|---|
| *G06F 15/173* | (2006.01) | |
| *H04L 29/08* | (2006.01) | |
| *H04L 12/66* | (2006.01) | |
| *H04L 12/721* | (2013.01) | |
| *H04L 29/06* | (2006.01) | |
| *H04W 4/70* | (2018.01) | |

(Continued)

(52) U.S. Cl.
CPC ............. *H04L 67/34* (2013.01); *H04L 12/66* (2013.01); *H04L 45/70* (2013.01); *H04L 67/12* (2013.01); *H04L 67/16* (2013.01); *H04L 69/14* (2013.01); *H04W 4/70* (2018.02); *H04W 88/06* (2013.01); *H04W 48/18* (2013.01)

(58) Field of Classification Search
CPC ......... H04L 12/66; H04L 45/70; H04L 67/34; H04L 67/12; H04L 67/16; H04L 69/14; H04W 4/70; H04W 88/06
USPC ........ 709/216, 218, 223, 250; 370/254, 328, 370/338, 401, 412
See application file for complete search history.

(56) References Cited

U.S. PATENT DOCUMENTS 8,848,608 B1 * 9/2014 Addepalli ............. H04W 4/046
370/328
9,220,027 B1 12/2015 Raleigh et al.
(Continued)

OTHER PUBLICATIONS

"Autonomic Networking", Autonomic Networking Configuration Guide, Cisco IOS Release 15S, http://www.cisco.com/c/en/us/td/docs/ios-xml/ios/auto_net/configuration/15-s/an-auto-net-15-s-book/an-auto-net-infra.html, 17 pages, Nov. 24, 2014, Cisco.
(Continued)

*Primary Examiner* — Dustin Nguyen
*Assistant Examiner* — Hao H Nguyen
(74) *Attorney, Agent, or Firm* — Behmke Innovation Group LLC; James M. Behmke; Jonathon P. Western (57) ABSTRACT

In one embodiment, a device in a network determines performance characteristics of a plurality of physical interfaces of the device. The device receives an application descriptive language-based description of performance requirements of a virtualized application for execution by the device. The device selects a particular one of the plurality of physical interfaces for use by the virtualized application during execution, based on the performance requirements of the virtualized application and on the performance characteristics of the plurality of physical interfaces. The device causes the virtualized application to use the selected physical interface during execution by the device.

13 Claims, 11 Drawing Sheets (51) Int. Cl.
  *H04W 88/06* (2009.01)
  *H04W 48/18* (2009.01)

(56) References Cited

U.S. PATENT DOCUMENTS

| | | | |
|---|---|---|---|
| 9,231,872 B2 | 1/2016 | Centoza et al. | |
| 9,491,076 B2 | 11/2016 | Mermoud et al. | |
| 2007/0192434 A1* | 8/2007 | Kodama | H04L 29/12377 709/218 |
| 2009/0083445 A1* | 3/2009 | Ganga | H04L 45/745 709/250 |
| 2015/0055640 A1 | 2/2015 | Wang et al. | |
| 2015/0063368 A1 | 3/2015 | Sharma et al. | |
| 2016/0218991 A1* | 7/2016 | Sharabi | G06F 9/45558 |
| 2018/0027079 A1* | 1/2018 | Ben Ali | G06F 9/45558 709/216 |
| 2018/0143825 A1* | 5/2018 | Noens | G06F 8/77 |
| 2018/0145884 A1* | 5/2018 | Stefanov | H04L 67/10 |
| 2018/0173522 A1* | 6/2018 | Hamill | G06F 8/73 |
| 2018/0288169 A1* | 10/2018 | Shi | H04L 41/20 |
| 2018/0373515 A1* | 12/2018 | Brown | G06F 8/4434 |

OTHER PUBLICATIONS

"Performance Routing (PfR)", http://www.cisco.com/c/en/us/products/ios-nx-os-software/performance-routing-pfr/index.html, 1 pages, Accessed Jan. 3, 2017, Cisco.

"Performance Routing version 3 for IOS-XE release", Workflow and Operation Guide, http://www.cisco.com/c/dam/en/us/td/docs/ios-xml/ios/pfrv3/configuration/work-flow/pfrv3-work-flow-guide.PDF, 113 pages, Nov. 2014, Cisco.

"PfR:Technology Overview", DocWiki, http://docwiki.cisco.com/wiki/PfR:Technology_Overview#Better_Application_performance_and_availability, 29 pages, Accessed Jan. 3, 2017, Cisco.

* cited by examiner

APPLICATION DESCRIPTIVE LANGUAGE FOR NETWORK GATEWAYS

TECHNICAL FIELD

The present disclosure relates generally to computer networks, and, more particularly, to the use of an application descriptive language for network gateways.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network. To support these paradigm changes, many IoT gateways of the future will support a number of different types of physical interfaces.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network determines performance characteristics of a plurality of physical interfaces of the device. The device receives an application descriptive language-based description of performance requirements of a virtualized application for execution by the device. The device selects a particular one of the plurality of physical interfaces for use by the virtualized application during execution, based on the performance requirements of the virtualized application and on the performance characteristics of the plurality of physical interfaces. The device causes the virtualized application to use the selected physical interface during execution by the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
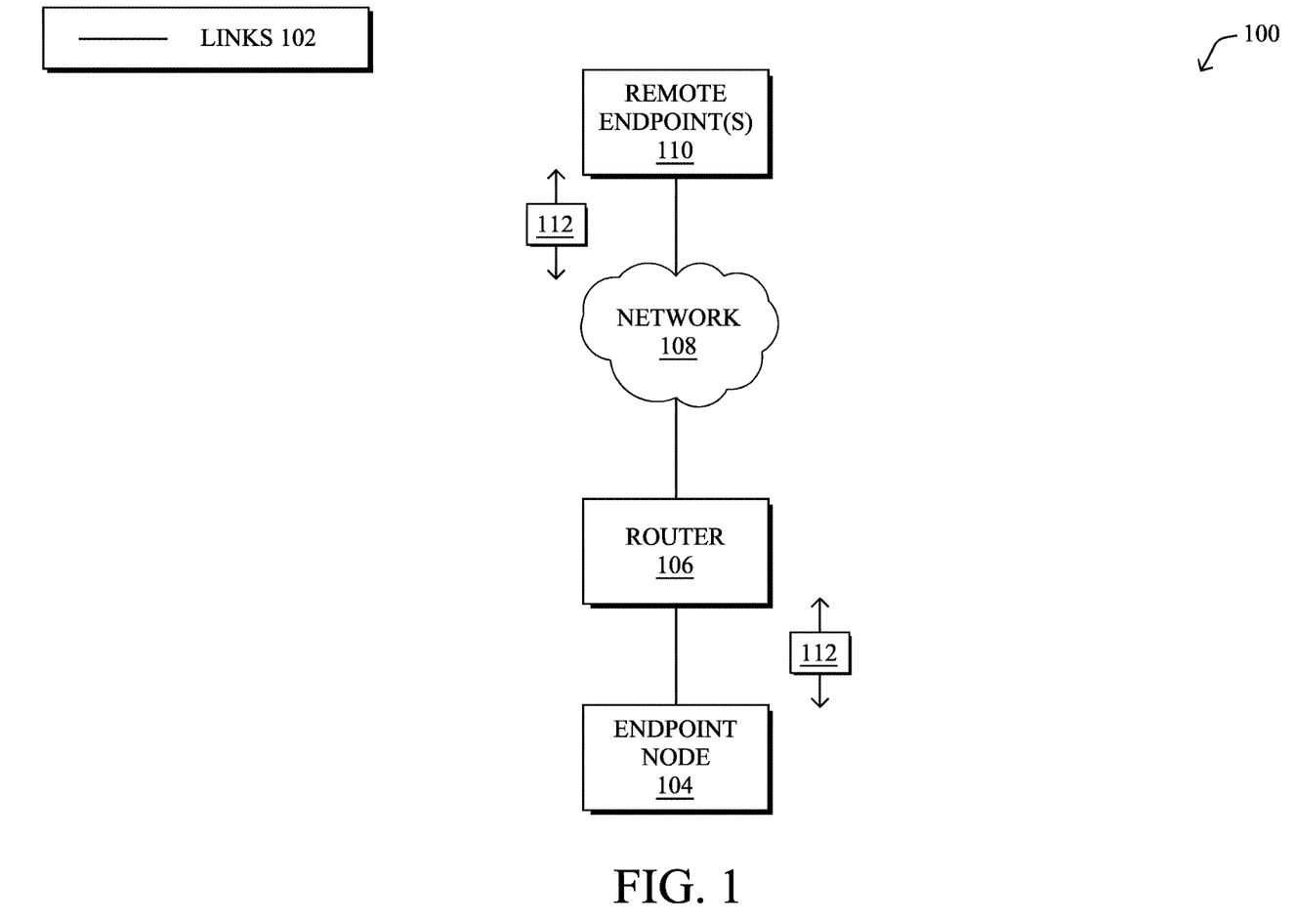
FIG. 1 illustrates an example communication network.

FIG. 1 is a schematic block diagram of an example computer network 100 illustratively comprising nodes/devices, such as an endpoint node 104. During operation, endpoint node 104 may exchange packets 112 with any number of remote endpoints 110 via a network 108. For example, remote endpoints 110 may include, but are not limited to, devices/servers located within a remote data center, corporate location (e.g., branch, campus, etc.), or part of a cloud-based service.

A router 106 may communicatively couple endpoint node 104 to network 108, which may include the public Internet, a multiprotocol label switching (MPLS) virtual private network (VPN), or the like. For example, router 106 may be a gateway or edge router that connects a LAN in which endpoint node 104 is located to network 108, which may be a WAN. As would be appreciated, any number of networking devices may present in computer network 100 to provide communications between the nodes/devices shown. For example, there may be any number of switches, firewalls, intrusion detection systems (IDSs), intrusion protection systems (IPSs), traffic analyzers, or the like, located between the endpoint node 104 and remote endpoints 110.

Links 102 may comprise any form of known wired or wireless communication link, or combination thereof. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, or the like. Example wireless links may include, but are not limited to, near field-based links, WiFi™ links, satellite links, cellular links, infrared links, Bluetooth™, or the like.

Packets 112 (e.g., traffic/messages) may be exchanged among the nodes/devices of the computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In various embodiments, endpoint node 104 may be an IoT device that is part of an IoT network serviced by router 106. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

As would be appreciated, many IoT devices are greatly constrained when compared to traditional computing devices. Notably, many IoT devices often have very limited resources in terms of processing power, memory, and/or energy (battery), and their interconnects are characterized by, illustratively, high loss rates, low data rates, and/or instability. For example, a battery-powered sensor may power itself on periodically, transmit a sensor reading, and then power down, to conserve energy.

In many cases, IoT networks are implemented as shared-media mesh networks, such as wireless or PLC networks, etc., often referred to as Low-Power and Lossy Networks (LLNs), which are a class of network in which both the local routers and their interconnects are constrained. Notably, their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point).

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Because of the significant limitations of typical IoT and LLN nodes, computations are often offloaded to a remote device. For example, as shown in FIG. 1, computations on behalf of endpoint node 104 may be performed by remote endpoints 110, such as by a cloud-based service. A more recent computational paradigm is referred to as "fog computing," which shifts the computations to any of the intermediary devices/nodes between the endpoint node and the "cloud," typically at the edge of the local network of the endpoint node. For example, router 106 may act as a fog computing device that performs computations on data from endpoint node 104, which may not have the local resources to do so, as is typical in IoT implementations.

Figure 2:
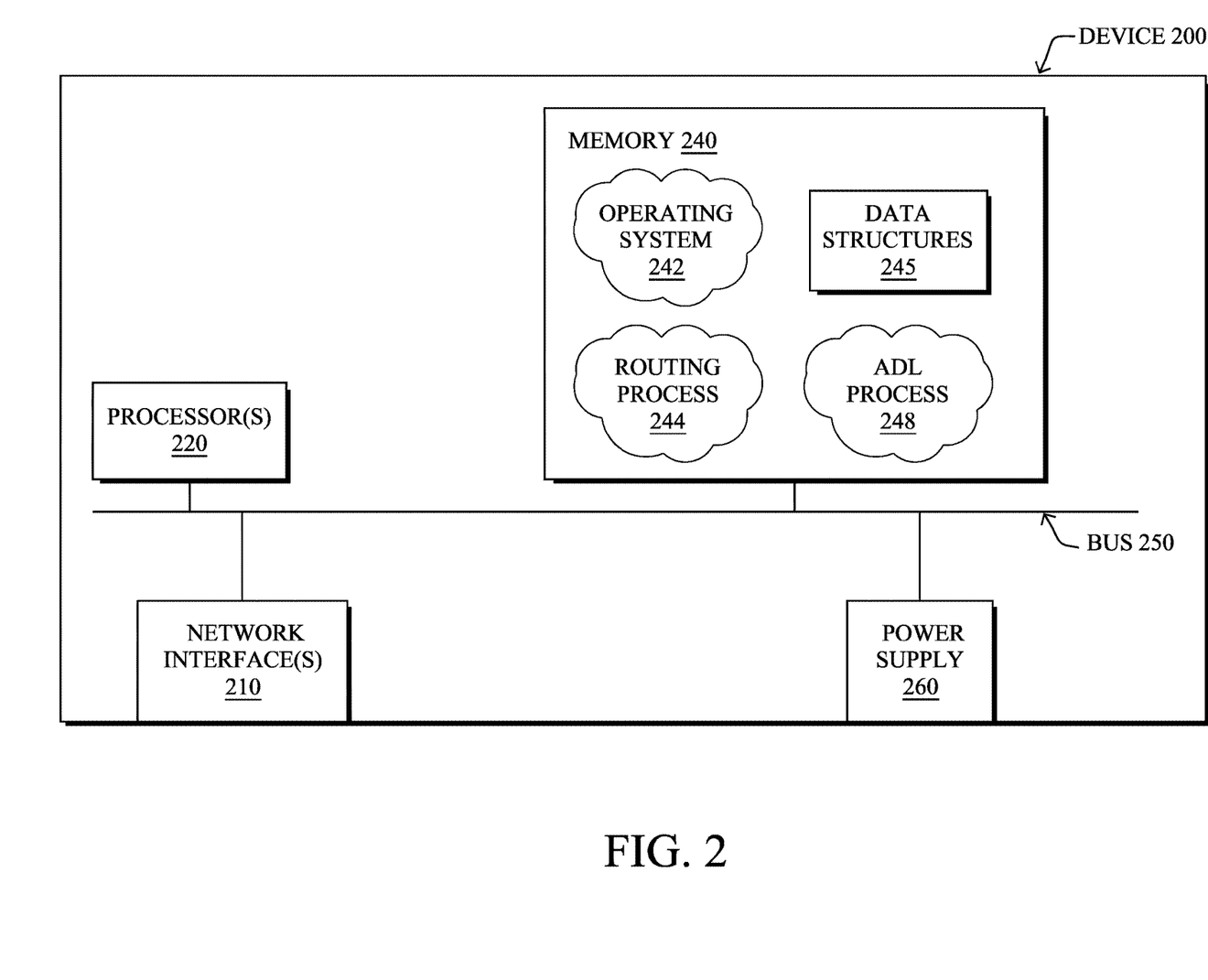
FIG. 2 illustrates an example network device/node.

FIG. 2 is a schematic block diagram of an example node/device 200 that may be used with one or more embodiments described herein, e.g., as any of the computing devices shown or referred to with respect to FIG. 1, particularly router 106, remote endpoint(s) 110, or any other computing device that supports the operations of network 108 (e.g., switches, etc.), as well as any of the other devices referenced below. The device 200 may also be any other suitable type of device depending upon the type of network architecture in place, such as IoT nodes, etc. As shown, device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, an application descriptive language (ADL) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

As noted above, the IoT is ever expanding and will soon permeate all walks of life. In particular, it is expected that IoT gateways will become nearly omnipresent in many areas and offer a large variety of locally-executed applications to support the numerous types of IoT nodes/devices. Many such IoT gateways in the future may also support multiple physical network interfaces such as, but not limited to, the following types of interfaces:

4G LTE
3G cellular (GSM/CDMA)
WIFI 802.11 ac client/Access Point
Async Serial
Ethernet WAN
Custom interfaces introduced by the BYOI connectors Simply having the IoT gateway rely on traditional routing rules to select the interface to be used by a particular application may not result in the optimal interface being selected. For example, if the application is very "chatty, but sends small amounts of data, traditional routing rules may select the 4G interface for use by the application. However, this disregards the requirements of the application itself. Notably, by also taking into account the perspective of the application, the 3G interface may actually be the optimal choice, since the application only needs to send a small amount of periodic data and precious 4G spectrum can be conserved.

Application Descriptive Language for Network Gateways

The techniques herein introduce an application descriptive language (ADL)-based approach that enables a gateway in a network to select a physical interface for use by an application executed by the gateway. In some aspects, the gateway may receive an ADL message or file that includes the requirements of the particular application, thereby allowing the gateway to make better decisions regarding the interfaces assigned to the applications.

Specifically, according to one or more embodiments of the disclosure as described in detail below, a device in a network determines performance characteristics of a plurality of physical interfaces of the device. The device receives an application descriptive language-based description of performance requirements of a virtualized application for execution by the device. The device selects a particular one of the plurality of physical interfaces for use by the virtualized application during execution, based on the performance requirements of the virtualized application and on the performance characteristics of the plurality of physical interfaces. The device causes the virtualized application to use the selected physical interface during execution by the device.

Illustratively, the techniques described herein may be performed by hardware, software, and/or firmware, such as in accordance with the ADL process 248, which may include computer executable instructions executed by the processor 220 (or independent processor of interfaces 210) to perform functions relating to the techniques described herein, e.g., in conjunction with routing process 244.

Figure 3A:
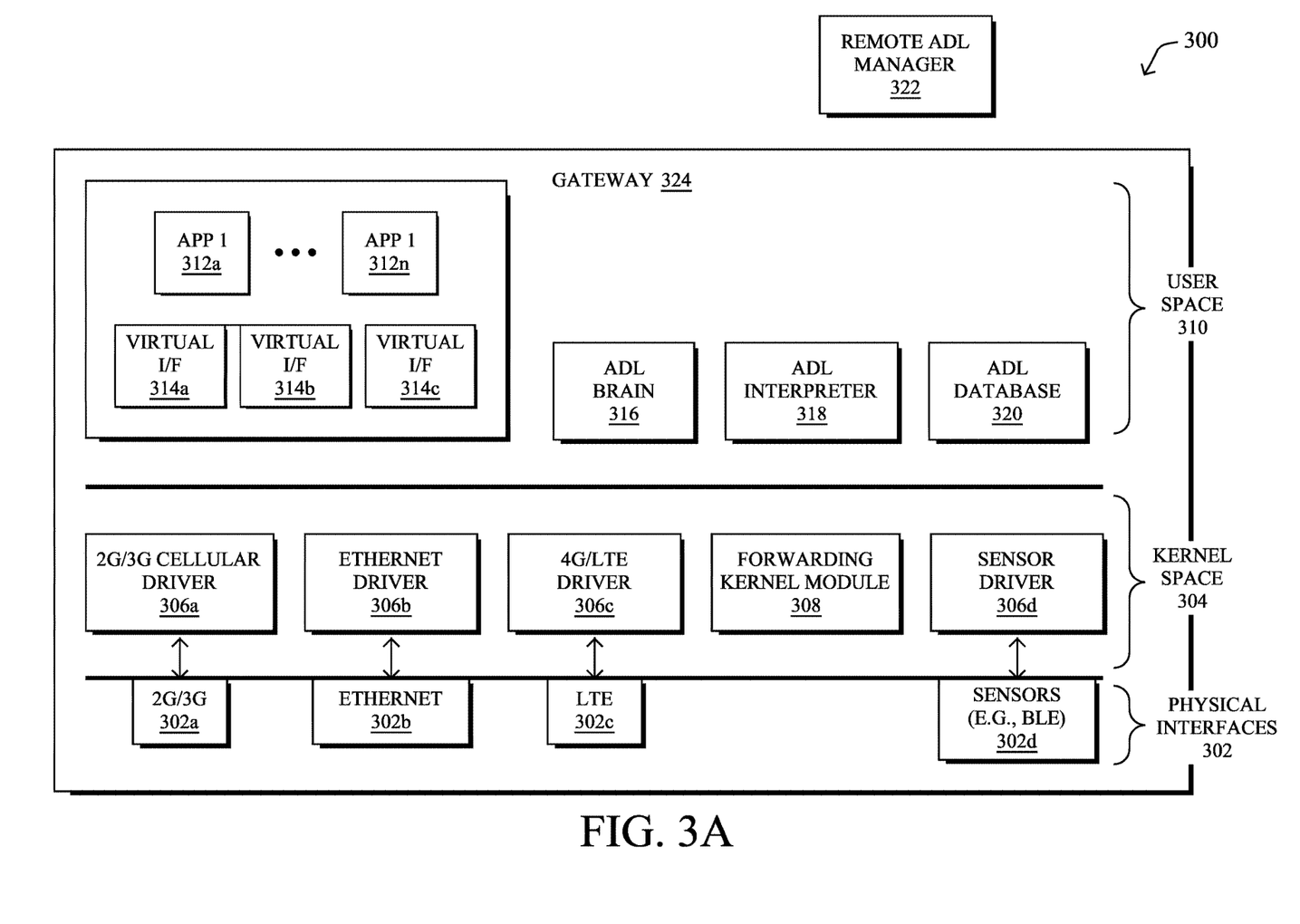
FIGS. 3A-3B illustrate an example architecture for the use of an application descriptive language by a gateway.
Figure 3B:
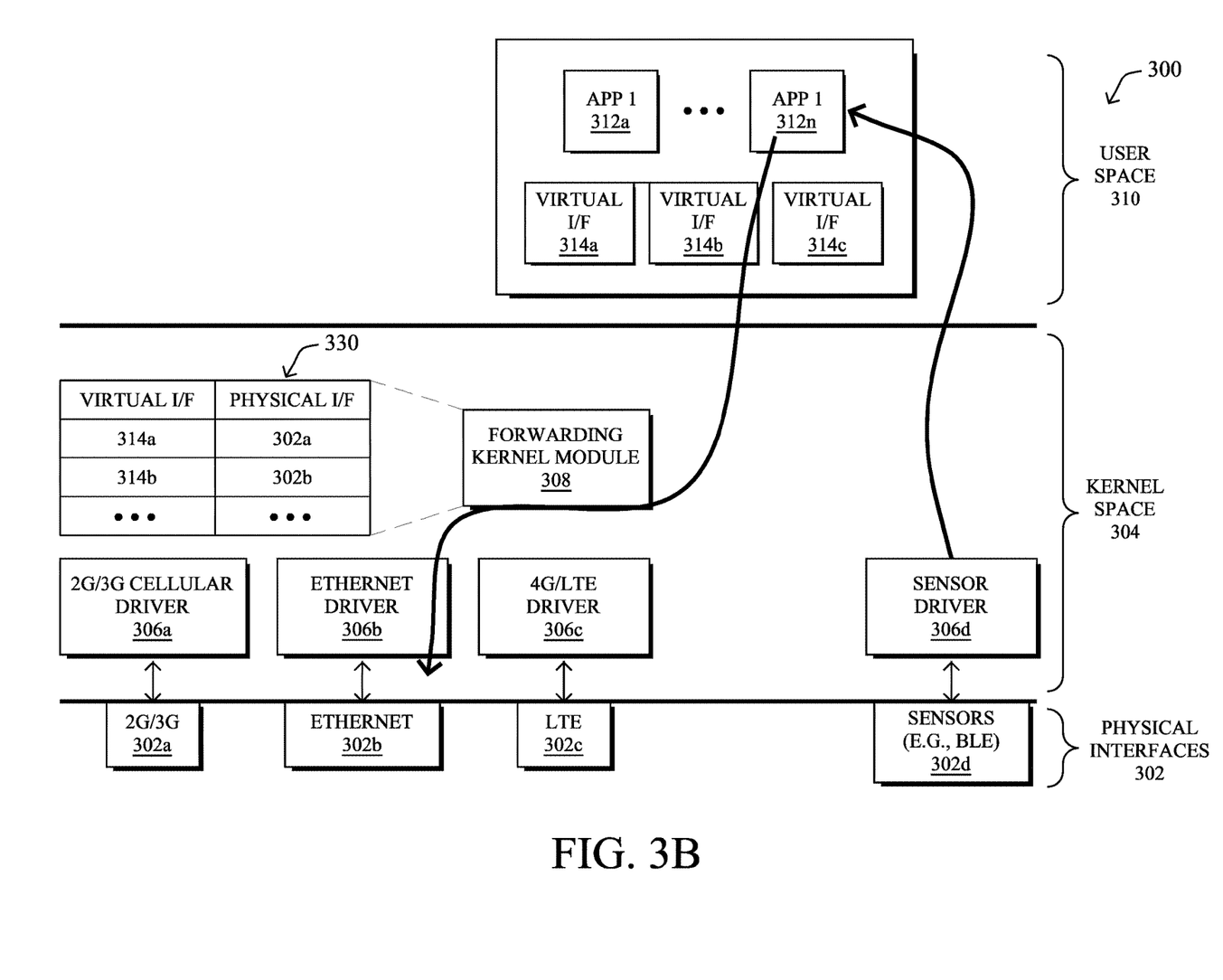

Operationally, FIGS. 3A-3B illustrate an example architecture 300 for the use of an ADL by a gateway 324, according to various embodiments. As shown, gateway 324 may be a network gateway that includes any number of physical interfaces 302. For example, gateway 324 may include a 2G/3G cellular interface 302a, an Ethernet interface 302b, a 4G LTE interface 302c, and one or more sensor interfaces 302d, such as a Bluetooth Low Energy (BLE) interface or the like. As would be appreciated, the number and types of physical interfaces 302 may vary, in other implementations.

Gateway 324 may also execute a variety of drivers/processes within a kernel space 304, to control physical interfaces 302 and provide a message passing scheme between the various programs executed by gateway 324 and physical interfaces 302. As would be appreciated, a kernel space is typically a memory area reserved for executing processes such as device drivers, kernel extensions, a privileged operating system kernel, and the like. For example, each of physical interfaces 302 may have a corresponding interface driver 306 executed within kernel space 304. In particular, 2G/3G cellular driver 306a may control 2G/3G interface 302a, Ethernet driver 306b may control Ethernet interface 302b, 4G/LTE driver 306c may control LTE interface 302c, and sensor driver 306d may control sensor(s) 302d.

Executing within a user space 310 of gateway 324 may be any number of applications 312 (e.g., a first through $n^{th}$ application). As would be appreciated, a user space is typically a separate memory location as that of a kernel space that is used for execution of user applications, etc. In IoT implementations, particularly, such applications 312 may be third-party applications that are used to process data on behalf of IoT nodes/devices connected to gateway 324.

In various embodiments, applications 312 may be virtualized, such as executed within a virtual machine (VM) or a container (e.g., a Docker container, etc.). In the case of VM-based implementations, each of applications 312 may be executed within its own, separately run operating system with its own set of binaries and libraries, with a hypervisor overseeing the execution of each VM. In containerized implementations, however, the operating system itself, the binaries, and/or libraries may be shared across applications as necessary. In either case, there may also be any number of virtualized interfaces 314 that correspond to the physical interfaces 302 of gateway 324.

A number of additional components are also introduced herein, according to various embodiments:
- A forwarding kernel module 308 executed in kernel space 304 that looks at the virtual interface 314 annotation in the packet buffer (sk_buf) and forwards the packet to the correct outbound physical interface 302.
- A remote ADL manager 322 that is executed by a device remote to gateway 324 (e.g., as a cloud-based service, etc.) and provides ADL-based information to gateway 324 regarding any or all of applications 312.
- An ADL interpreter 318 configured to interpret the ADL-based information received from ADL manager 322.
- An ADL "brain" 316 that executes in user space 310 and queries the various WAN drivers 306, to obtain the performance characteristics of their corresponding physical interfaces 302. The ADL brain 316 also performs the physical interface selections for applications 312, as detailed below.
- An ADL database 320 that stores the various characteristics of physical interfaces 302 and is updated periodically by ADL brain 316.

FIG. 3B illustrates a data path example of the interactions of the virtual and physical interfaces of gateway 324, according to various embodiments. Assume that sensor data is received via physical sensors interface 302d. In such a case, sensor driver 306d will forward the received data to the appropriate application (e.g., application 312n). After performing the requisite fog computation on the data, application 312n will forward the processed data to its virtual WAN interface 314c.

Prior to sending the processed data from application 312n on to a remote device via a physical interface 302, forwarding kernel module 308 may operate in conjunction with the ADL brain 316 to select the optimal physical interface 302 to use. In some embodiments, forwarding kernel module 308 may maintain a mapping 330 of virtual interfaces 314 to physical interfaces 302 (e.g., a forwarding table), as computed by the ADL brain 316. In turn, forwarding kernel module 308 may use mapping 330 to determine that the data from application 312n received via virtual interface 314c should be sent to a device remote from gateway 324 via Ethernet interface 302b.

By way of a more concrete example, consider the case of an IoT node that is a wearable heart rate monitor/sensor. During operation, the heart rate monitor may periodically send a heart rate reading of its user to gateway 324. In turn, gateway 324 may execute a health evaluation application that ensures that the measured heart rate reading is within an expected range. The application may then send an indication of its evaluation to one or more other devices, such as a mobile device of a healthcare provider or of a cloud-based service, via the selected physical interface of gateway 324.

Figure 4A:
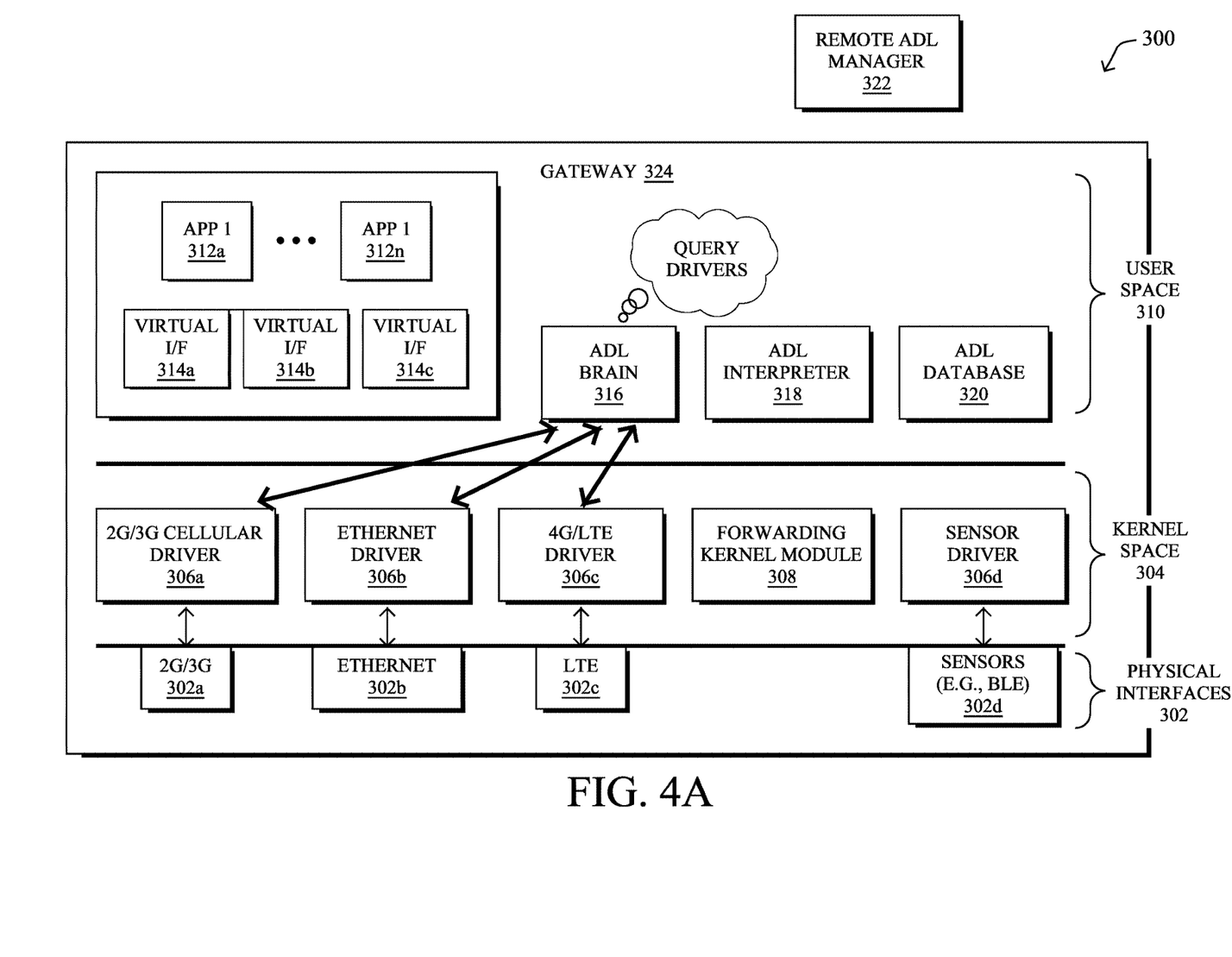
FIGS. 4A-4E illustrate examples of a gateway using a description of an application to assign a physical interface to the application.

FIGS. 4A-4E illustrate examples of gateway 324 using a description of an application, to assign a physical interface to the application, according to various embodiments. As shown, consider the architecture 300 described previously in FIGS. 3A-3B. In FIG. 4A, ADL brain 316 may periodically query each of the interface drivers 306 for the performance characteristics of their corresponding physical drivers 302. Generally, these performance characteristics may be indicative of the overall capabilities of physical interfaces 302 and/or the current statuses of physical interfaces 302. For example, ADL brain 316 may query drivers 306 for their bandwidth information (e.g., max bandwidth, current bandwidth, etc.), latency information (e.g., minimum latency, maximum latency, etc.), jitter information, and the like.

Figure 4B:
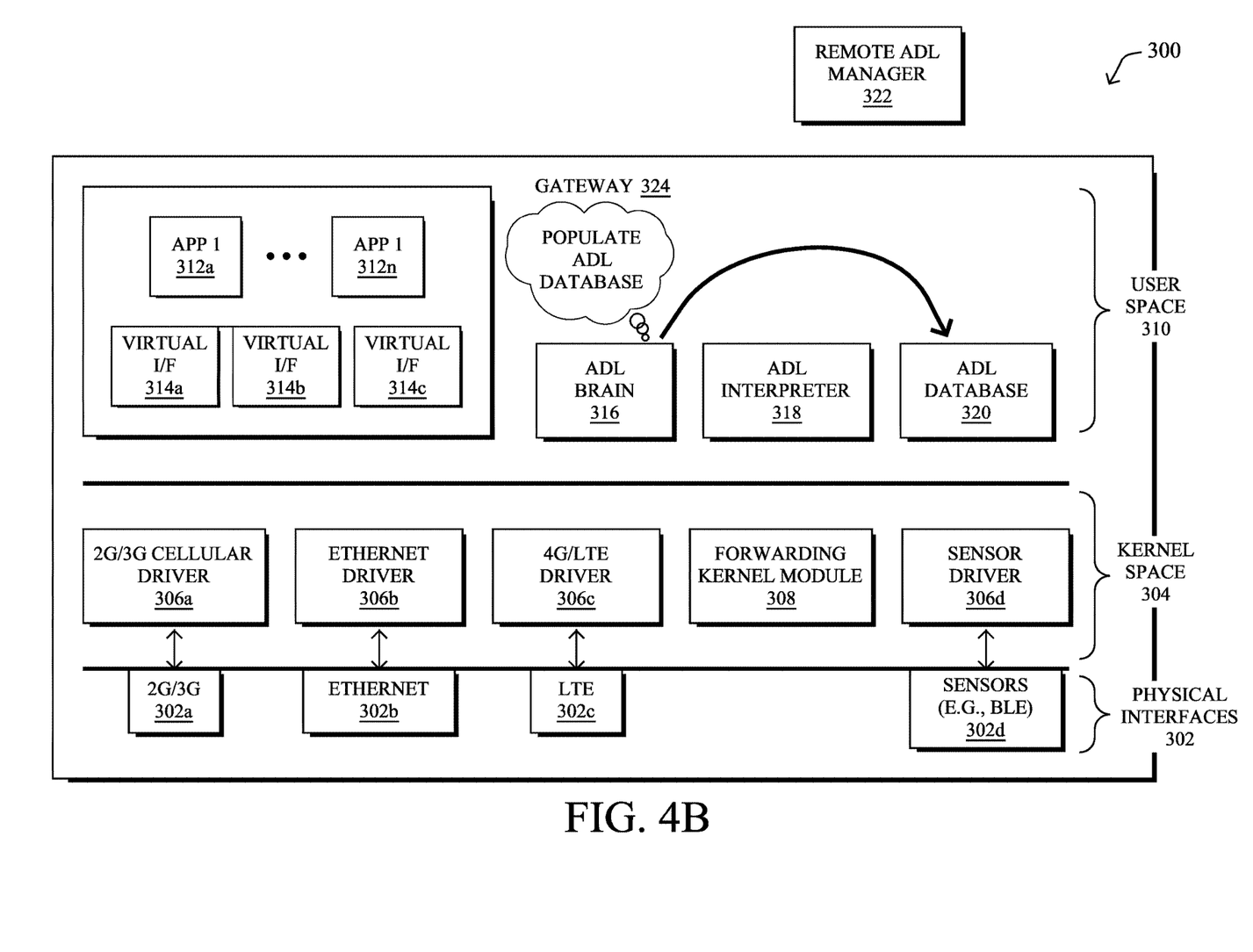

In FIG. 4B, ADL brain 316 may use the received performance characteristics of the physical interfaces 302 from drivers 306 to populate ADL database 320. In various embodiments, ADL brain 316 may periodically query drivers 306 and update database 320 at predefined intervals. Additionally, ADL brain 316 may also receive the performance characteristics on a push basis (i.e., without first sending a query), in some cases. For example, if a given characteristic exceeds a defined threshold, this may trigger the updated characteristic to be sent to ADL brain 316.

Figure 4C:
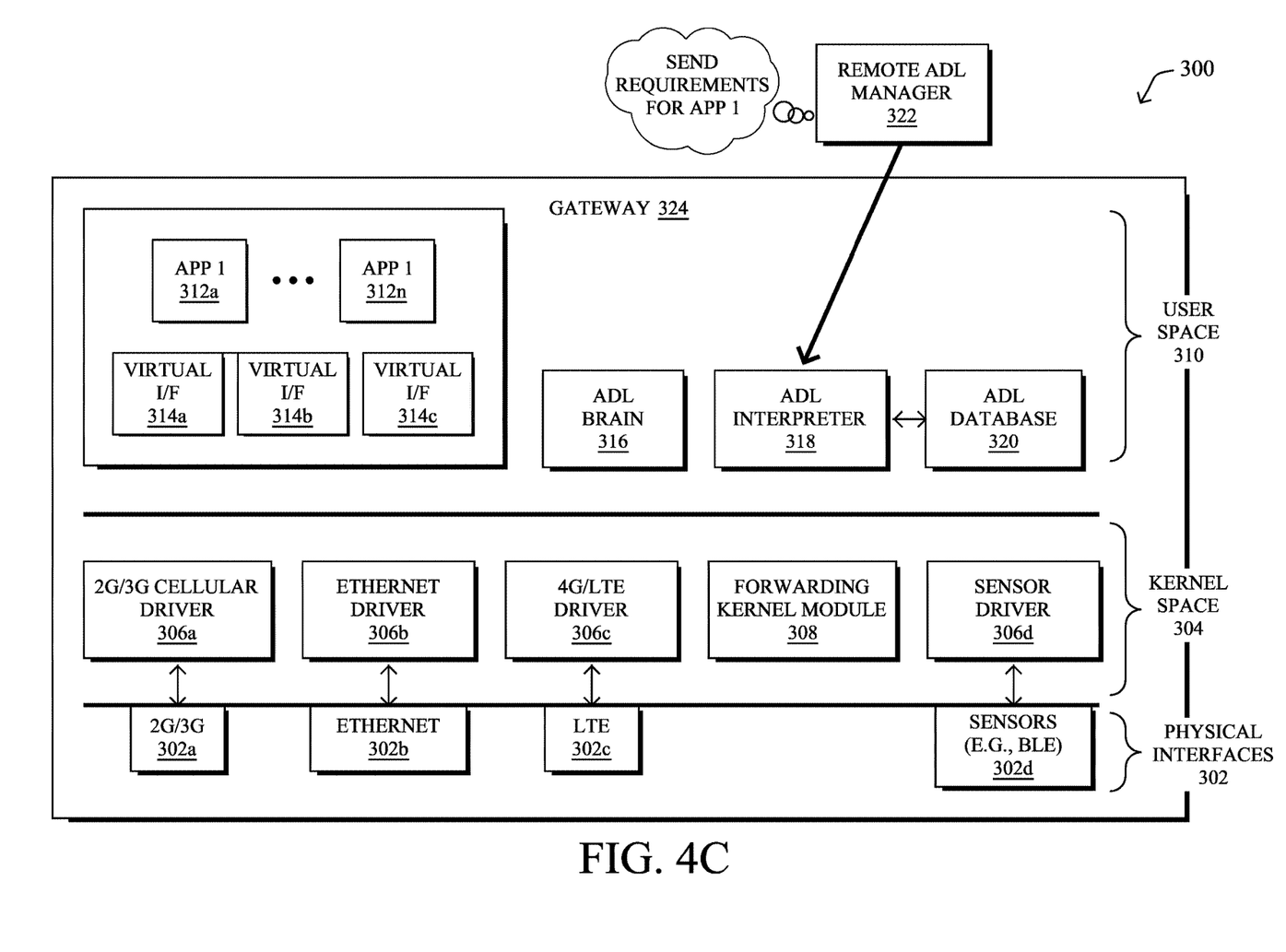

In FIG. 4C, remote ADL manager 322 may send an ADL-based description 326 of the performance requirements of an application (e.g., application 312a) to ADL interpreter 318. Such performance requirements may include any or all of the following:
- The bandwidth desired by application 312a.
- The min/max latency for application 312a.
- The jitter tolerance of application 312a.
- The chattiness of application 312a.
- The store and forward messaging of application 312a, based on network availability, time of day, etc.

Any suitable description language may be used to convey the descriptions of the applications to ADL interpreter 318. ADL interpreter 318 may also be configured to support any number of different types of ADLs. In one embodiment, the application descriptions may be written in YAML. For example, consider the following application requirements:
Bandwidth: 1 Kbps
Minimum Latency: 100 msec
Maximum Latency: 150 msec
Jitter Tolerance: 10 msec
Chattiness (measured in times per minute): 12
In such a case, a corresponding YAML-based application description may look as follows:
Application Descriptor Language Example
manifest-version: 1.0
  info:
    name: demo application
    description: "Demo Application"
    version: 1.0
    author-name: Foo, Inc.
    author-link: "http://www.foo.test"
  app:
    apptype: StoreAndForward
    resources:
      bandwidth: 1 kbps
      min-latency: 100 msec
      max-latency: 150 msec
      jitter-tolerance: 10 msec
      chattiness: 12 pm Thus, ADL interpreter 318 now has both the identity of the application, as well as its performance requirements. In turn, ADL interpreter 318 may store this information in ADL database 320 for future consumption by ADL brain 316.

Figure 4D:
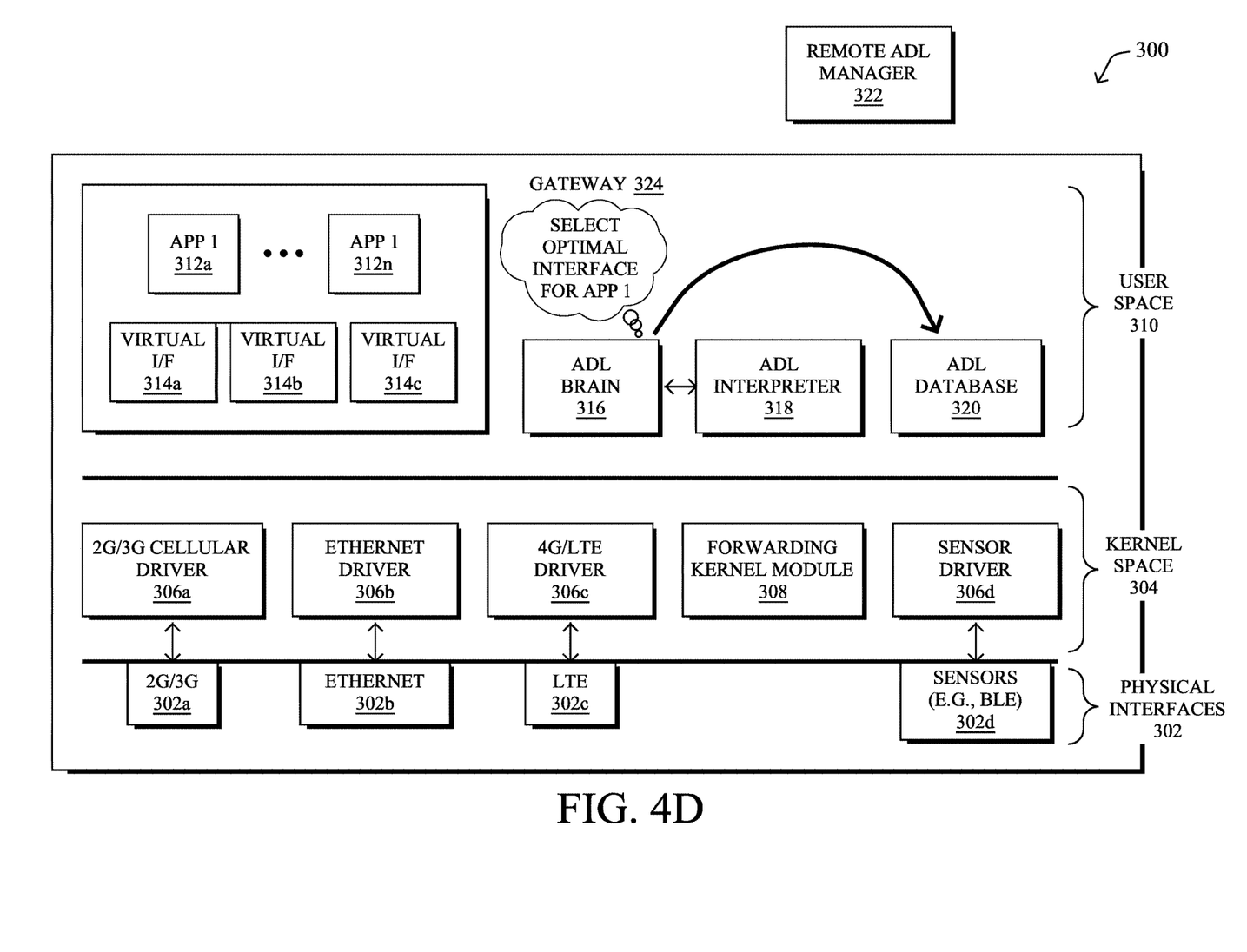

In FIG. 4D, ADL brain 316 may select the optimal physical interface 302 for use by application 312*a*, based on the performance characteristics of physical interfaces 302 in ADL database 320 and the performance requirements of application 312*a* from the ADL-based description of application 312*a*. For example, assume that both 2G/3G interface 302*a* and 4G/LTE interface 302*c* are able to meet the performance requirements of applications 312*a*. In such a case, ADL brain 316 may then determine that the optimal selection is 2G/3G interface 302*a*, as it would free up 4G resources while still meeting the performance requirements of application 312*a*.

Figure 4E:
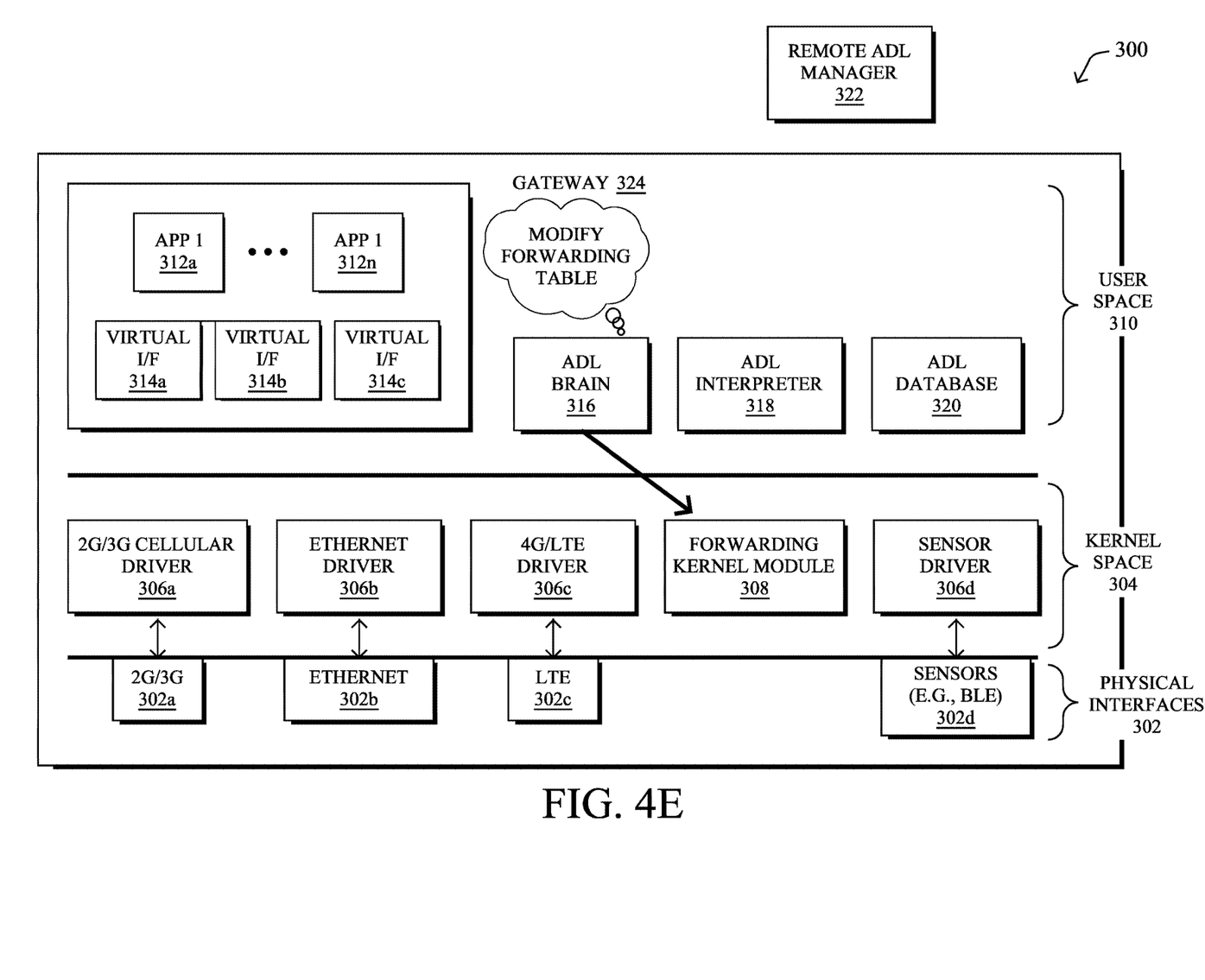

In FIG. 4E, after selecting physical interface 302*a* for use by application 312*a*, ADL brain 316 may modify the forwarding table/mapping 320 of forwarding kernel module 308, to associate the virtual interface 314 of application 312*a* with physical interface 302*a*. Thus, when application 312*a* is to send processed data from gateway 324 to another device, forwarding kernel module 308 is able to ensure that physical interface 302*a* is used.

Figure 5:
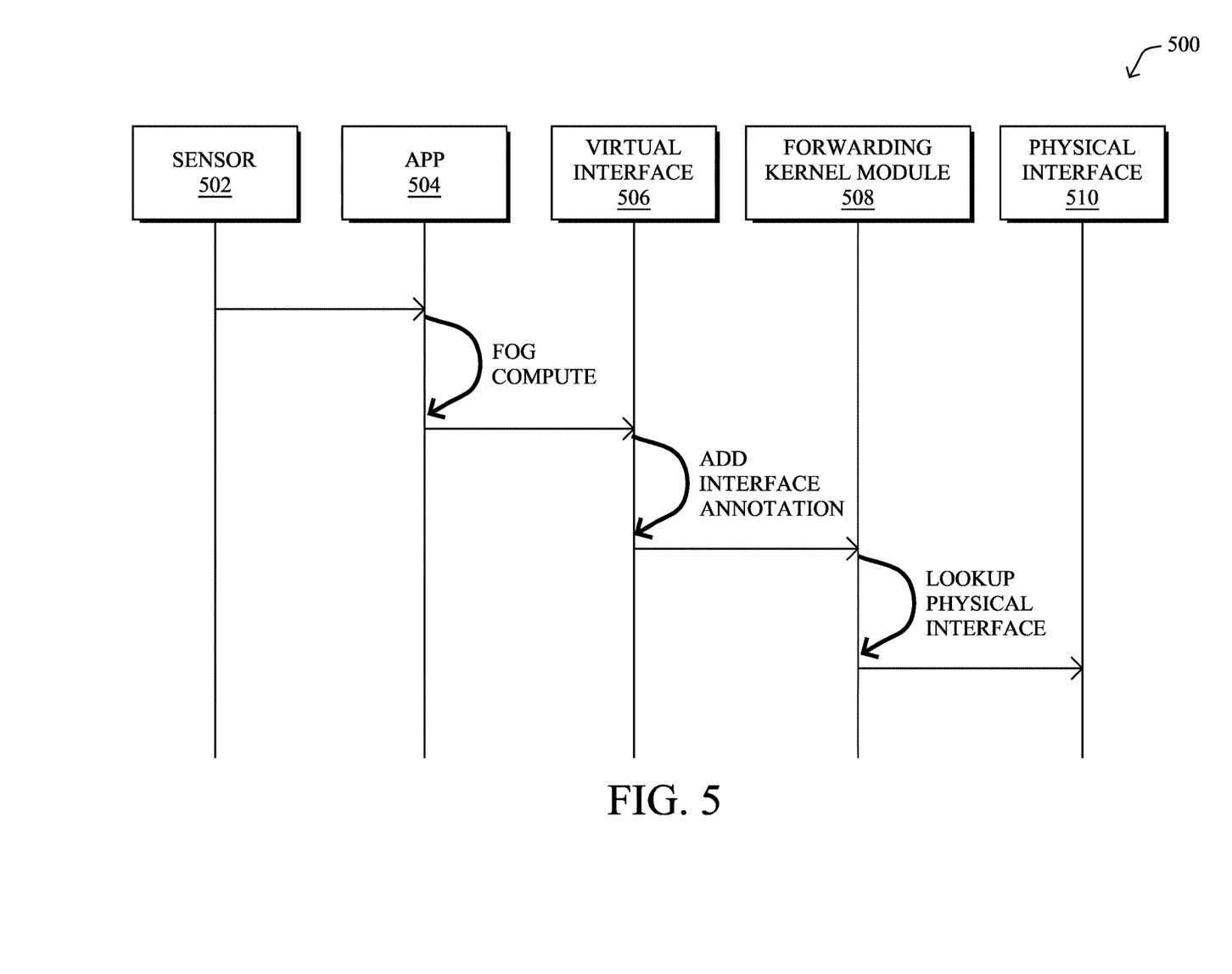
FIG. 5 illustrates an example data flow diagram using the technique herein.

FIG. 5 illustrates an example data flow diagram 500 using the technique herein. As shown, a sensor 502 may forward a data packet to a virtualized application 504 for processing. In turn, application 504 may perform its fog computing on the data and send the processed data to virtual interface 506. Virtual interface 506 then adds its interface annotation to the data packet and sends the packet to forwarding kernel module 508. As noted above, such a module may maintain a forwarding table that maps virtual to physical interfaces of the executing device. Thus, forwarding kernel module 508 may perform a lookup of the corresponding physical interface 510, based on the annotation information within the packet that indicates the packet was sent by virtual interface 506. In turn, forwarding kernel module 508 may send the packet to physical interface 510 for sending to a remote endpoint device.

Figure 6:
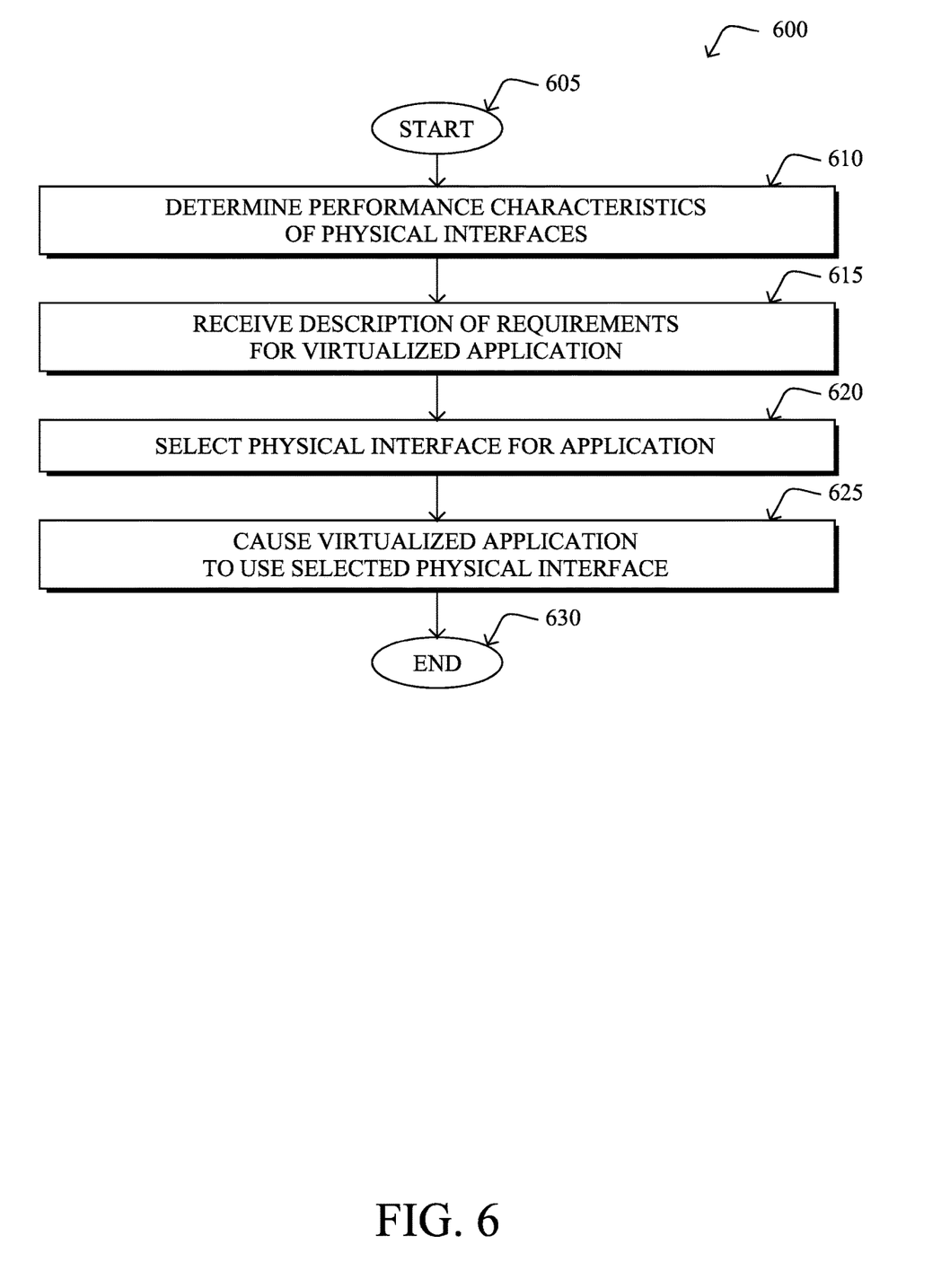
FIG. 6 illustrates an example simplified procedure for causing an application to use a selected physical interface based on a description of the application.

FIG. 6 illustrates an example simplified procedure for causing an application to use a selected physical interface based on a description of the application, in a network in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may determine performance characteristics of a plurality of physical network interfaces of the device. For example, the device may determine the available bandwidth, latency (e.g., minimum, maximum, etc.), time of day, chattiness, store and forward information, or any other performance characteristics of the physical interfaces. Such interfaces may include, but are not limited to, various cellular interfaces (e.g., 2G/3G, 4G LTE, etc.), wired interfaces (e.g., Ethernet, etc.), satellite, other wireless (e.g., Wi-Fi, etc.), and the like.

At step 615, as detailed above, the device may receive a description of the requirements of a virtualized application for executing by the device. In some embodiments, the device itself may be a network gateway or other networking device that executes the virtualized application as a fog computing-based application. Such an application may, for example, be executed by the device within a VM or container. In various embodiments, the description may be application descriptive language (ADL)-based description. For example, the device may receive the description as a YAML-based description of the application from a remote supervisory/management device. Example requirements may include, but are not limited to, a required bandwidth, min/max latency, jitter tolerance, the chattiness of the application, and/or an indication of the store and forward messaging of the application.

At step 620, the device may select a particular one of the physical network interfaces for use by the application, as described in greater detail above. In particular, the device may compare the performance characteristics of the physical interfaces to the requirements of the application, so as to ensure an optimal assignment. For example, optimality may be seen in some implementations as a guarantee that the least capable physical interface is used by the application that still satisfies the requirements of the application.

At step 625, as detailed above, the device may cause the virtualized application to use the selected physical interface. For example, the device may maintain a mapping between a virtual interface of the virtualized application and that of the selected physical interface. Then, whenever the application send a packet via the virtual interface, the device may use the mapping to ensure that the packet is sent via the selected physical interface. Procedure 600 then ends at step 630.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an application-oriented routing scheme that does not require any modification to the application or cloud controller. Instead, the intelligent interface election is based on an ADL description of the application. Further, packets are able to be forwarded to the optimal interface without any need for deep packet inspection (DPI), as in the case of many performance routing mechanisms. In addition, the techniques enable future upgrading of a BYOI interface without any modification of the ADL-aware application. By periodically updating the ADL database with the performance characteristics of the interfaces, the techniques also ensure the most efficient use of the interfaces based on the current ADL parameters.

While there have been shown and described illustrative embodiments that provide for the use of an application descriptive language by a networking device, it is to be understood that various other adaptations and modifications may be made within the spirit and scope of the embodiments herein. For example, while certain embodiments are described herein with respect to using certain protocols or languages (e.g., YAML, etc.), other protocols or languages may be used, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a gateway in an internet of things (IoT) network, performance characteristics of a plurality of physical interfaces of the gateway;
   receiving, at the gateway from a cloud-based application management service, an application descriptive language-based description of performance requirements of a virtualized application for execution by the gateway;
   optimally selecting, by the gateway, a particular one of the plurality of physical interfaces for use by the virtualized application during execution, based on the performance requirements of the virtualized application and on the performance characteristics of the plurality of physical interfaces; and
   causing, by the gateway, the virtualized application to use the selected physical interface during execution,
   wherein the causing of the virtualized application to use the selected physical interface during execution comprises:
      receiving, at a virtual interface of the gateway, sensor data processed by the virtualized application;
      adding, by the virtual interface, an interface annotation of the virtual interface to the processed data;
      receiving, at a forwarding kernel module of the gateway from the virtual interface, the processed data having the interface annotation added thereto;
      performing, by the forwarding kernel module, a lookup in a forwarding table maintained by the forwarding kernel module of a physical interface among the plurality of physical interfaces based on the interface annotation, and
      sending, by the forwarding kernel module, the processed data to the selected physical interface in accordance with the performed lookup.

2. The method as in claim 1, wherein the plurality of physical interfaces comprises a cellular interface and a wired network interface or comprises a bring your own interface (BYOI).

3. The method as in claim 1, wherein the application descriptive language comprises YAML.

4. The method as in claim 1, wherein the virtualized application when executed by the gateway processes the sensor data received by the gateway from a sensor in the network.

5. The method as in claim 1, wherein the performance characteristics of the plurality of physical interfaces comprise one or more of: available bandwidth, latency, jitter, time of day, chattiness, or store and forward information.

6. An apparatus, comprising:
   a plurality of physical network interfaces;
   a processor coupled to the plurality of network interfaces and configured to execute a process; and
   a memory configured to store the process executable by the processor, the process when executed configured to:
      determine performance characteristics of the plurality of physical network interfaces;
      receive from a cloud-based application management service an application descriptive language-based description of performance requirements of a virtualized application for execution by the apparatus;
      optimally select a particular one of the plurality of physical network interfaces for use by the virtualized application during execution, based on the performance requirements of the virtualized application and on the performance characteristics of the plurality of physical network interfaces; and
      cause the virtualized application to use the selected physical network interface during,
      wherein, when the virtualized application is caused to use the selected physical interface during execution, the process is further configured to:
         receive, at a virtual interface of the apparatus, sensor data processed by the virtualized application;
         add, by the virtual interface, an interface annotation of the virtual interface to the processed data;
         receive, at a forwarding kernel module of the apparatus from the virtual interface, the processed data having the interface annotation added thereto;
         perform, by the forwarding kernel module, a lookup in a forwarding table maintained by the forwarding kernel module of a physical interface among the plurality of physical interfaces based on the interface annotation; and
         send, by the forwarding kernel module, the processed data to the selected physical interface in accordance with the performed lookup, and
      wherein the apparatus is a network gateway in an Internet of Things (IoT) network.

7. The apparatus as in claim 6, wherein the plurality of physical network interfaces comprises a cellular interface and a wired network interface.

8. The apparatus as in claim 6, wherein the application descriptive language comprises YAML.

9. The apparatus as in claim 6, wherein the virtualized application when executed by the apparatus processes the sensor data received by the apparatus from a sensor in the IoT network.

10. The apparatus as in claim 6, wherein the performance characteristics of the plurality of physical interfaces comprise one or more of: available bandwidth, latency, jitter, time of day, chattiness, or store and forward information.

11. A tangible, non-transitory, computer-readable medium storing program instructions that, when executed by a network gateway in an Internet of things (IoT) network, cause the device to perform a process comprising:
   determining, by the network gateway, performance characteristics of a plurality of physical interfaces of the gateway;
   receiving, at the network gateway from a cloud-based application management service, an application descriptive language-based description of performance requirements of a virtualized application for execution by the network gateway;
   optimally selecting, by the network gateway, a particular one of the plurality of physical interfaces for use by the virtualized application during execution, based on the performance requirements of the virtualized application and on the performance characteristics of the plurality of physical interfaces; and
   causing, by the network gateway, the virtualized application to use the selected physical interface during execution,
   wherein the causing of the virtualized application to use the selected physical interface during execution comprises:
      receiving, at a virtual interface of the gateway, sensor data processed by the virtualized application;

adding, by the virtual interface, an interface annotation of the virtual interface to the processed data;

receiving, at a forwarding kernel module of the gateway from the virtual interface, the processed data having the interface annotation added thereto;

performing, by the forwarding kernel module, a lookup in a forwarding table maintained by the forwarding kernel module of a physical interface among the plurality of physical interfaces based on the interface annotation; and sending, by the forwarding kernel module, the processed data to the selected physical interface in accordance with the performed lookup.

12. The computer-readable medium as in claim 11, wherein the application descriptive language comprises YAML.

13. The computer-readable, medium as in claim 11, wherein the virtualized application when executed by the network gateway processes the sensor data received by the network gateway from a sensor in the IoT network.

* * * * *

UNITED STATES PATENT AND TRADEMARK OFFICE
CERTIFICATE OF CORRECTION

PATENT NO. : 10,666,766 B2
APPLICATION NO. : 15/479484
DATED : May 26, 2020
INVENTOR(S) : Sujay Gopinathan Page 1 of 1

It is certified that error appears in the above-identified patent and that said Letters Patent is hereby corrected as shown below:

In the Claims

Column 11, Line 38, Claim 1 please amend as shown:
annotation; and

Column 12, Line 8, Claim 6 please amend as shown:
physical network interface during execution, Column 13, Line 17, Claim 13 please amend as shown:
13. The computer-readable medium as in claim 11, Signed and Sealed this
Eighteenth Day of August, 2020

Andrei Iancu
*Director of the United States Patent and Trademark Office*